United States Patent [19]

Kato et al.

[11] Patent Number: 4,603,946

[45] Date of Patent: Aug. 5, 1986

[54] REFLECTION CONTROLLABLE VIEW MIRROR DEVICE FOR MOTOR VEHICLE OR THE LIKE

[75] Inventors: Shigeru Kato; Junichi Nakaho; Makoto Shibahara, all of Aichi, Japan

[73] Assignee: Kabushiki Kaisha Tokai Rika Denki Seisakusho, Aichi, Japan

[21] Appl. No.: 534,604

[22] Filed: Sep. 22, 1983

[30] Foreign Application Priority Data

Sep. 29, 1982 [JP] Japan .................. 57-147510[U]
Sep. 30, 1982 [JP] Japan .................. 57-149940[U]
Apr. 30, 1983 [JP] Japan .................. 58-66626[U]
Apr. 30, 1983 [JP] Japan .................. 58-66625[U]
May 18, 1983 [JP] Japan .................. 58-74960[U]

[51] Int. Cl.$^4$ .......................... G02F 1/13; G02B 5/08
[52] U.S. Cl. .............................. 350/331 R; 350/355; 350/279; 350/338
[58] Field of Search ............... 350/331 R, 338, 279, 350/278, 283, 355

[56] References Cited

U.S. PATENT DOCUMENTS 3,862,798  1/1975  Hopkins ...................... 350/278

FOREIGN PATENT DOCUMENTS

2808260  8/1979  Fed. Rep. of Germany ...... 350/278
2029343  3/1980  United Kingdom ............... 350/279

Primary Examiner—John K. Corbin
Assistant Examiner—B. S. Shapiro
Attorney, Agent, or Firm—Steele, Gould & Fried

[57] ABSTRACT

A reflection controllable view mirror device having an electro-optical assembly which changes its optical transmittance to vary quantity of light passing therethrough in accordance with the magnitude of the applied voltage, a control circuit to control the transmittance at a value so as to ensure predetermined uniform reflection under circumstances permitting transmittance to deviate from inherent one because of deterioration or the like. Another control circuit is provided to control to ensure the inherent transmittance for predetermined reflection under the same circumstances.

5 Claims, 26 Drawing Figures

FIG. 4
control circuit

FIG. 5
control circuit

REFLECTION CONTROLLABLE VIEW MIRROR DEVICE FOR MOTOR VEHICLE OR THE LIKE

BACKGROUND OF THE INVENTION

1. Field of the Art

This invention relates to a reflection controllable view mirror device having an electro-optical means in which the optical transmittance changes in accordance with the voltage impressed thereon.

2. Description of the Prior Art

It has recently been contemplated to introduce a view mirror device of the type particularly for use in motor vehicles. The device has a flat mirror plate attached to one side of a liquid crystal pane, which acts as an electro-optical means, comprising a pair of opposed vitreous base plates each carrying a transparent electrode, and a liquid crystal encapsulated between the base plates.

Such is the construction that the panel transmittance varies with the change of voltage impressed across the electrodes. The varying transmittance controls the quantity of light passing through the panel to avoid an excessive amount of reflection from the panel to prevent glare.

The transmittance of the panel unavoidably undergoes changes because of dimensional deviations caused during the manufacturing process, because of the influence of the ambient temperatures, or because of deterioration from aging. These conditions render it difficult to maintain the transmittance constant as intended under the determined voltage and thus the present panels cannot provide effective glare prevention.

SUMMARY OF THE INVENTION

It is therefore a primary object of the invention to provide a reflection controllable view mirror device which will be effective in obviating the preceding difficulty of the prior art counterpart.

It is an object of the invention to provide a reflection controllable view mirror device which is capable of providing a constant reflection despite dimensional deformations, the influences of the ambient temperature, or deterioration from aging.

It is another object of the invention to provide a reflection controllable view mirror device which is capable of automatically adjusting a determined reflection therefrom in response to intensity increased light such as, for example, headlights of another motor vehicle.

It is a further object of the invention to provide a reflection controllable view mirror device which is capable of automatically adjusting a determined reflection to an extent necessary to avoid glare or dazzle by providing a photo-sensitive means for detecting the ambient light, taking into consideration whether the reflection glare or dazzle depends on the ambient light.

According to the invention, there is provided a reflection controllable view mirror device comprising an electro-optical means which changes its optical transmittance to vary the quantity of light passing therethrough in accordance with the magnitude of the voltage impressed thereon, a mirror means mounted on a suitable portion of the electro-optical means, a first photo-sensitive means which receives the light passing through the electro-optical means, a control circuit which controls the voltage impressed upon the electro-optical means in accordance with the photo-receptor signal from the first photo-sensitive means, whereby the transmittance is controlled to be reduced upon the increase of light incident on the mirror means and to be increased with the decrease of incident light.

There is also provided a reflection controllable view mirror device comprising an electro-optical means which changes its optical transmittance to vary the quantity of light passing therethrough in accordance with the magnitude of voltage impressed thereon, a mirror means mounted on a suitable portion of the electro-optical means, the electro-optical means being divided into a sensing portion which only allows the light to pass and a mirror portion which permits the light passing therethrough to fall on the mirror means and to be reflected back thereby, a photo-sensitive means which receives the light passing through the sensing portion, a control circuit which changes the photo-receptor signal from the photo-sensitive means by alternately impressing the reference voltage and a temporarily determined voltage upon the said sensing portion and which controls the voltage impressed upon the mirror portion in accordance with the changes in the photo-receptor signal.

The above and other objects, features and advantages of the present invention will become apparent from the following description and the appended claims taken in conjunction with the accompanying drawings which shows by way of example preferred embodiments of the present invention and in which like component parts are designated by like reference numerals throughout the various figures.

DESCRIPTION OF THE PREFERRED EMBODIMENTS

Figure 1:
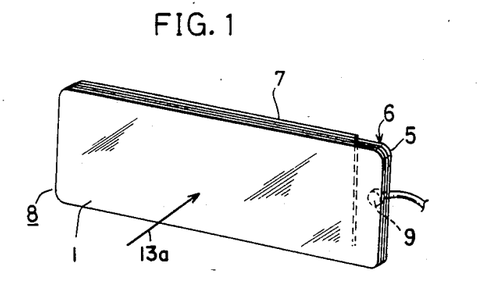
FIG. 1 is a perspective view showing a view mirror device according to a first embodiment of the invention.
Figure 2:
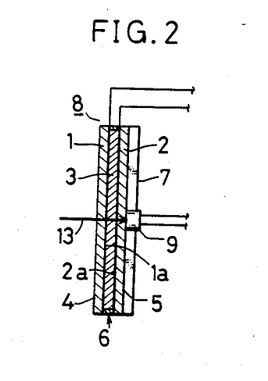
FIG. 2 is an enlarged cross sectional view of the view mirror device.
Figure 3:
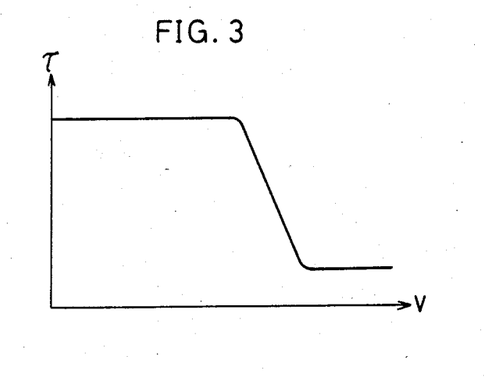
FIG. 3 is a graph showing voltage vs. optical transmittance characteristics of an electro-optical means.

Referring to the drawings and first to FIGS. 1 through 4, there is shown a view mirror device suitable to be associated with a motor vehicle according to a first embodiment of the invention; In FIGS. 1 and 2, a pair of opposed rectangular base plates 1, 2 are shown which are made from transparent material such as, for example, vitreous material, and which have a liquid crystal 3 encapsulated therebetween. The base plates 1, 2 have coextensive, transparent sheet-shaped electrodes 1a, 2a attached to each on the side which is positioned contiguous to the liquid crystal 3.

The plates 1, 2 each have an optical polarization filter 4, 5 attached to the side opposite to the liquid crystal 3 in generally overall extension thereover to cosntitute a T.N. type (twisted nematic) liquid crystal panel 6 which serves as an electro-optical means. Behind the panel 6 is a flat mirror 7 mounted on the base plate 2 to form a view mirror construction 8 in cooperation with the panel 6. In this instance, the mirror 7 is adapted to be smaller than the panel 6 in latitudinal length and has one longitudinal end terminate somewhat short of one end of the panel 6. The view mirror construction 8 thus constructed is mounted on the upper portion of a front window of a motor vehicle such as, for example, an automobile (not shown) to act as a rear view mirror.

It is noted that the employment of a G.H. (guest-host) type liquid crystal panel instead of the T.N. type permits dispensing with the polarization filter 5, so the base plate 2 may have a specular layer at the side positioned opposite to the liquid crystal 3 instead of the flat mirror 7. Optionally, the electrode 2a may comprise a specular layer.

Behind the liquid crystal panel 6 is placed a photo-sensitive medium 9 which is made from cadmium sulphide to vary its electrical resistance value depending upon the intensity of light to which it is subjected. In this instance, the panel 6 is arranged to allow the voltage applied across the electrodes 1a and 2a to have the characteristics represented in FIG. 3 with the axis of ordinates as optical transmittance ($\tau$) and the axis of abscissas as voltage (V).

Figure 4:
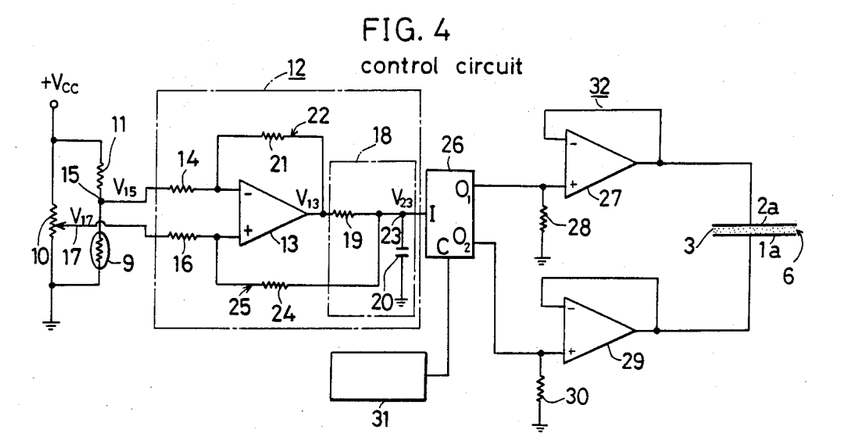
FIG. 4 is an electrical diagram of a control circuit according to the first embodiment of the invention.

Attention is called to FIG. 4 which depicts an electrical diagram of a control circuit. A DC electrical power source has a terminal (+Vcc) grounded via a rheostat 10 which is connected in parallel with the series circuit comprising a resistance 11 and the photo-sensitive medium 9.

A differential amplifier circuit 12 includes a differential amplifier 13, the negative input terminal (−) of which is connected via a resistance 14 to a detector terminal 15 which is a common point of the resistance 11 and the photo-sensitive medium 9. The positive input terminal (+) of the amplifier 13 is connected via a resistance 16 to a reference terminal 17 which acts as the wiper of the rheostat 10. The amplifer 13 further has its output terminal grounded via a delay circuit 18 which includes a resistance 19 and a condenser 20 connected in series. Across the output terminal and the negative input terminal (−) is connected a resistance 21 to form a negative feed-back circuit 22. Across the positive terminal of the amplifier 13 and an output terminal 23 is connected a resistance 24 to form a positive feed-back circuit 25. An analog switch designated 26 has its input terminal connected to the output terminal 23 of the delay circuit 18. The switch 26 has one output terminal ($O_1$) bifurcate to connect one end to the positive input terminal (+) of an operational amplifier 27, and the other end to ground via a resistance 28. Simultaneously, the same switch 26 has another output terminal ($O_2$) bifurcate to connect one end to the positive input terminal (+) of another operational amplifier 29, and the other end to ground via a resistance 30 with its control terminal (C) being connected to an oscillatory circuit 31.

The circuit is designed so that the analog switch 26 has its input terminal (I) conductive to the output terminal ($O_1$) upon detecting high level output, the high level output being generated from the oscillatory circuit 31 which is fed to the control terminal (C). Concurrently, the switch 26 shifts the input terminal (I) to be conductive to another output terminal ($O_2$) upon low level output. In this instance, the analog switch 26 determines the duty ratio of the oscillatory output at both high and low levels.

The operational amplifiers 27 and 29 have their output terminals connected across the electrodes 1a and 2a. The analog switch 26, the operational amplifiers 27, 29 and the oscillatory circuit 31 constitute a driver circuit 32 to apply AC voltage to the liquid crystal 3, the effective value of the voltage to be equivalent to the output voltage ($V_{23}$) at the output terminal 23 of the differential amplifier circuit 12.

Still referring to FIG. 1, the light (indicated by arrow 13a for convenience) which is incident on the view mirror construction 8 passes through the liquid crystal panel 6 to be reflected at the flat mirror 7, so that the quantity of reflection from the mirror 8 depends upon how much of the light passes through the panel 6.

The light which passes through the panel 6 falls on the photo-sensitive medium 9 to appear as a resistance in a manner that it decreases with the increase of intensity of the light. That is, the photo-sensitive medium 9 renders its resistance inversely proportional to the optical quantity of the light passes which through the panel 6.

In so doing, the rheostat 10 has its output terminal 17 generate a reference voltage ($V_{17}$) by adjustng the wiper as suitably determined, while the photo-sensitive medium 9 has its detector terminal 15 generate a detector voltage ($V_{15}$), the magnitude of which corresponds to the optical quantity that the medium 9 is exposed to.

Accordingly, the light incident on the mirror construction 8 from, for example, the head lamps of a trailing automobile, causes an increase in the optical quantity of light which passes through the panel 6, so that the medium 9 decreases its resistance and renders the detector voltage ($V_{15}$) significantly smaller than the reference voltage ($V_{17}$). This causes the differential amplifier 13 to generate an output voltage ($V_{13}$), the intensity of which corresponds to the difference between the detector voltage ($V_{15}$) and the reference voltage ($V_{17}$), permitting the output voltage ($V_{13}$) to appear as an output voltage ($V_{23}$) at the output terminal 23 via the delay circuit 18. The output voltage ($V_{23}$) is alternately applied to the positive input terminals or the operational amplifiers 27 and 29 to impress AC voltage across the electrodes 1a and 2a with the voltage ($V_{23}$) as the effective voltage, thereby resulting in small optical transmittance ($\tau$) of the liquid crystal panel 6. This reduces the optical quantity of the light that passes through the panel 6 to increase the resistance of the photo-sensitive medium 9 to an extent that the detector voltage ($V_{15}$) becomes approximately equal to the reference voltage ($V_{17}$).

Absence of light incident on the mirror construction 8 from the head lamps, reduces the optical quantity of the light which passes through the panel 6, so that the photo-sensitive medium 9 increases its resistance to admit small intensity difference between the reference voltage ($V_{17}$) and the detector voltage ($V_{15}$) so as to allow smaller output voltage ($V_{13}$). This results in elevated optical transmittance ($\tau$) of the liquid crystal panel 6 to admit high optical quantity and the lowering of the resistance of the photo-sensitive medium 9 so that the detector voltage ($V_{15}$) approaches the reference voltage ($V_{17}$).

In this way, the detector voltage ($V_{15}$) which serves as a photo-receptor signal is maintained as suitably determined to ensure substantially uniform optical quantity of light to pass through the panel 6.

As evident from the foregoing description, the control circuit controls the voltage applied to the liquid crystal panel so as to determine the detector voltage ($V_{15}$), thus automatically adjusting the optical quantity of light which passes through the panel 6 under circumstances where the light incident on the mirror 8 changes its optical strength.

This makes it possible to control reflection from the view mirror construction 8 as determined irrespective of whether the optical transmittance deviates from the original design under the influences of the ambient temperature, deterioration from aging, or the like.

Figure 5:
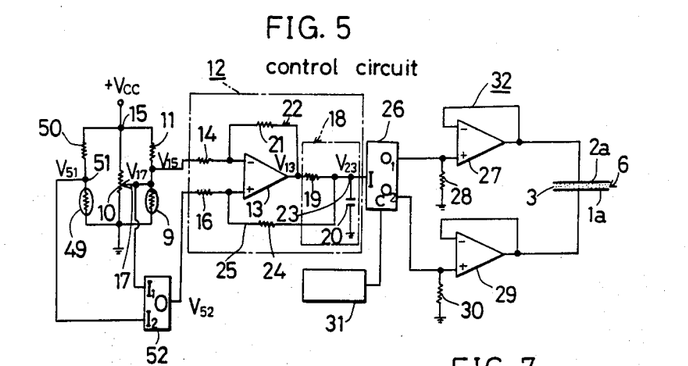
FIG. 5 is an electrical diagram of a control circuit according to a second embodiment of the invention.

FIG. 5 shows a second embodiment of the invention. Numeral 49 designates a photo-sensitive medium of cadmium sulfide which is susceptible to the ambient light. The medium 49, which acts as a photo-sensor, is connected across the DC power source terminal (+Vcc) and ground via a resistance 50 in series therewith. A calculator circuit designated 52 connects its second input terminal ($I_2$) to a detector terminal 51 which is a common point of the resistance 50 and the photo-sensitive medium 49. The first input terminal ($I_1$) of the calcuator circuit 52 is connected to the reference terminal 17 of the rheostat 10. The circuit 52 also connects its output terminal (O) to the positive input terminal of the differential amplifier 13 via the resistance 16.

In general, it is found that whether the reflection from the mirror construction 8 is glaring or dazzling depends upon the intensity of the ambient light. Therefore, care must be taken that the construction 8 should not be rendered unacceptable as a view mirror because of absence of reflection should the panel 6 control its transmittance irrespective of the intensity of the ambient light.

In order to cope with the situation, the photo-sensor 49 is provided. The photo-sensor 49 is designed to subject its electrical resistance to change according to the ambient light by allowing the detector voltage ($V_{51}$) at the terminal 51 to decrease with the increase of the ambient light.

The voltage ($V_{51}$) thus decreased is fed into the second input terminal ($I_2$) of the calculator circuit 52. The circuit 52 allows the first input terminal ($I_1$) to be fed with the reference voltage ($V_{17}$) of the reference terminal 17 so as to calculate the transmittance necessary to provide the most suitable quantity of reflection on the basis of the reference voltage ($V_{15}$) and the detector voltage ($V_{51}$).

By so doing, the reference voltage ($V_{52}$) which serves as a reference signal, and corresponds to the transmittance calculated as above, is produced at the output terminal (O) to be fed into the positive input terminal of the differential amplifier 13.

Figure 6:
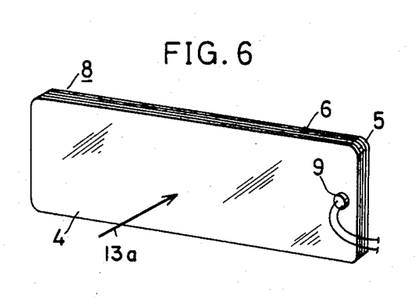
FIG. 6 is a view similar to FIG. 1 according to a third embodiment of the invention.
Figure 7:
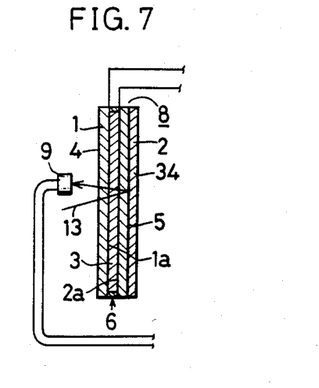
FIG. 7 is an enlarged cross sectional view of the embodiment illustrated in FIG. 6.
Figure 8:
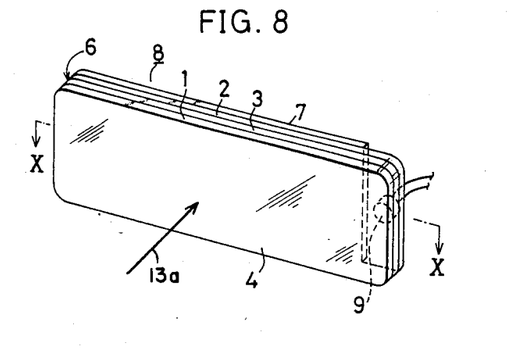
FIG. 8 is a view similar to FIG. 1 according to a fourth embodiment of the invention.
Figure 9:
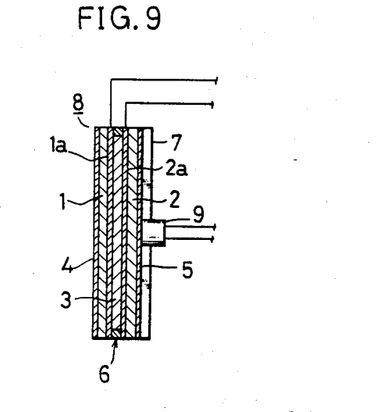
FIG. 9 is an enlarged cross sectional view of the embodiment illustrated in FIG. 8.
Figure 10:
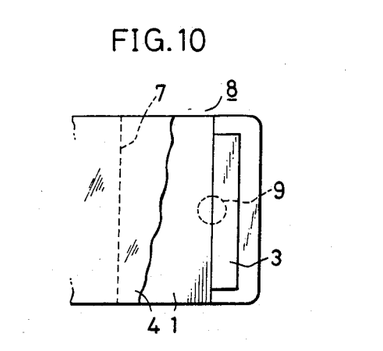
FIG. 10 is a partial front elevational view showing a view mirror device, but partly broken away.

FIGS. 6 and 7 show a third embodiment of the invention in which instead of the flat mirror 7, a new flat mirror 34 is mounted having a latitudinal length equivalent to that of the liquid crystal panel 6. The photo-sensitive medium 9 is disposed at the left of the mirror construction 8 to face toward the front side of the polarization filter 4 as shown.

By so doing the light incident on the mirror construction 8 reflects at the mirror 34 after passing through the panel 6 so as to fall on the photo-sensitive medium 9, resulting in a photo-receptor signal from the medium 9 which is commensurate with the optical quantity of light which passes through the panel 6.

FIGS. 8 through 11 show a fourth embodiment of the invention.

In this instance, the electrodes 1a and 2a each have one of their lengthwise ends terminate somewhat short of the end of the panel 6 so as to be located between one end of the flat mirror 7 and one end of the panel 6. This divides the panel 6 into a reflection area 6a in which the flat mirror 7 is present, a transmittance variable area 6b in which the mirror 7 is absent and a transmittance non-variable area 6c in which the mirror 7 and the electrodes 1a, 2a are absent as seen in FIG. 11.

With this structure, the light incident on the panel 6 falls on the photo-sensitive medium 6 through the transmittance variable area 6b and through the transmittance non-variable area 6c, so that the magnitude of the photo-receptor signal is contingent on the transmittance ($\tau$) of the panel 6 plus the intensity of the incident light itself.

Figure 11:
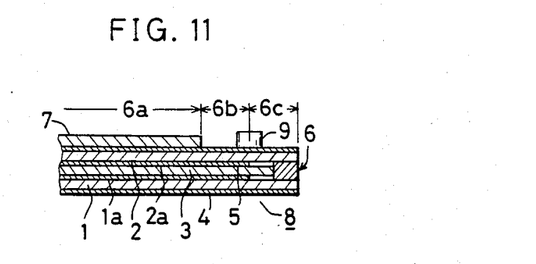
FIG. 11 is a partial, latitudinal, cross sectional view taken along the line X—X of FIG. 8, but partly broken away.

In this instance, the transmittance non-variable area 6c is not susceptible to change of its optical transmittance owing to the absence of the electrodes, as readily understood from the foregoing description in reference with FIG. 11.

Incidentally, it is contemplated to provide the transmittance variable area 6b alone so as to let the light fall on the photo-sensitive medium 9 therethrough. However, the presence of the transmittance variable area 6b alone allows stronger light to excessively reflect at the mirror, inducing glare or dazzle in those instances where the photo-sensitive medium 9 is adjusted to its most suitable sensitivity under the ambient light of smaller intensity upon determining the magnitude of the photo-receptor signal of the control circuit.

Conversely, in those instances where the photo-sensitive medium is adjusted under ambient light of greater intensity, it renders a weaker light ineffective to reflect at the mirror so as to result in a darker image.

In contrast, according to the embodiment of the invention, stronger light incident on the panel 6 effects a change in the photo-receptor signal to the predetermined level due to the fact that light passing through the transmittance variable area 6b, and light passing through the transmittance non-variable area 6c simultaneously falls on the photo-sensitive medium 9 to reduce the optical transmittance ($\tau$). This lessens the quantity of the reflection from the mirror construction 8 to a degree sufficient to prevent glaring or dazzling.

Figure 12:
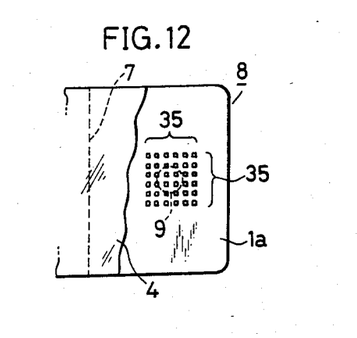
FIG. 12 is a view similar to FIG. 10 according to a fifth embodiment of the invention.
Figure 13:
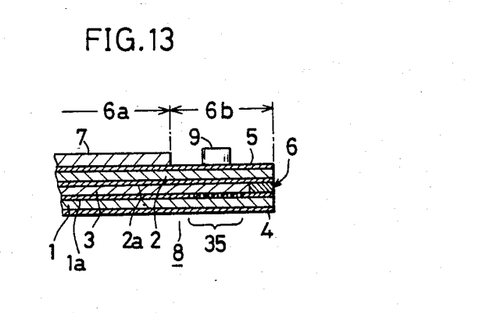
FIG. 13 is a view similar to FIG. 11.

FIGS. 12 and 13 show a fifth embodiment of the invention in which the construction is similar to that of the fourth embodiment except that the electrodes 1a, 2a have their right ends lengthened to correspond to the ends of the base plates 1, 2, and the electrode 1a is provided with transverse and lateral series of perforations 35 at the right portion which is located so as to face the photo-sensitive medium 9 across the panel 6.

Such is the construction that the panel 6 constitutes a transmittance variable area 6b except for the portion opposed to the perforations 35, which perforations render the optical transmittacne ($\tau$) insusceptible to change.

Figure 14:
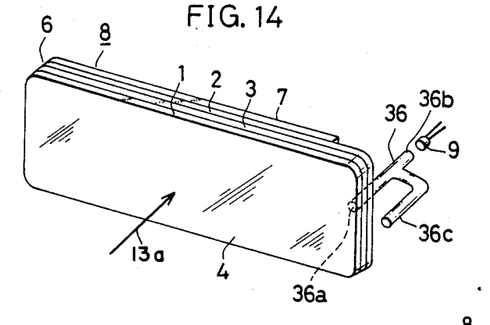
FIG. 14 is a view similar to FIG. 1 according to a sixth embodiment of the invention.
Figure 15:
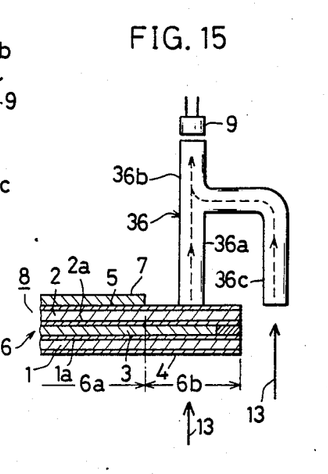
FIG. 15 is a partial latitudinal cross sectional view showing a view mirror device together with an optical fiber tube.

FIGS. 14 and 15 show a sixth embodiment of the invention in which a bifurcated optical fiber 36 is provided in front of the panel instead of the perforations 35 of the electrode 1a in the fifth embodiment. The optical fiber 36 has one end 36a located contiguous with the polarization filter 5 of the transmittance variable area 6b, while other end 36b is opposed to the photo-sensitive medium 9. The optical fiber 36 also has a central branch 36c positioned in the neighborhood of the right side of the panel 6 so as to be exposed to light similar to that incident on the view mirror 8.

This construction allows the photo-sensitive medium 9 to simultaneously admit light passing through the transmittance variable area 6b, and light which is directly incident on the branch 36c by way of the optical fiber 36.

Therefore, the effects are similar to those obtained in the fourth embodiment.

Figure 16:
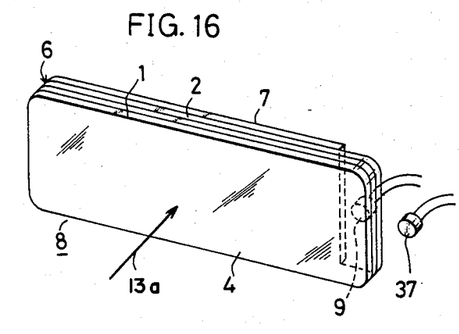
FIG. 16 is a view similar to FIG. 1 according to a seventh embodiment of the invention.
Figure 17:
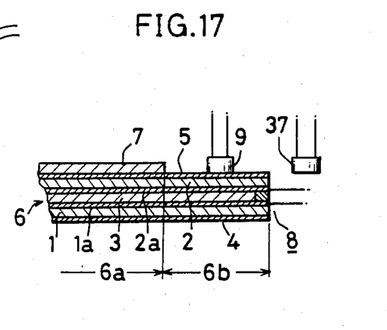
FIG. 17 is a view similar to FIG. 11.
Figure 18:
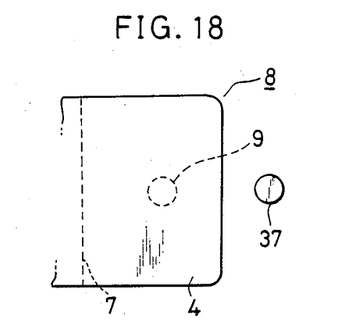
FIG. 18 is a view similar to FIG. 10.

FIGS. 16 through 18 show a seventh embodiment of the invention in which a second photo-sensitive medium 37 is provided instead of the optical fiber 36 of the sixth embodiment. The second photo-sensitive medium 37 is connected in series with the preceding photo-sensitive medium 9 in a control circuit (not shown) similar to that illustrated in FIG. 4, and arranged to be located in the lateral neighborhood of the right side of the pane 6 to be exposed to light similar to that incident on the mirror 8.

Such is the construction that the control circuit allows the generation of a detector voltage ($V_{15}$) corresponding to the summation of the photo-receptor signals which are produced from the photo-sensitive media 9 and 37 when both admit light.

In consequence, the light released toward the panel 6 works to reduce its optical transmittance ($\tau$) as determined not only by the photo-sensitive medium 9 but also the second photo-sensitive medium 37, and thus stops the mirror 8 from glaring or dazzling as mentioned in the preceding embodiments.

Figure 19:
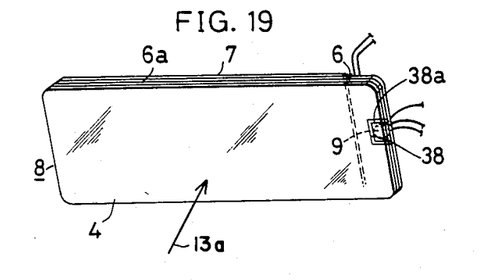
FIG. 19 is a view similar to FIG. 1 according to an eighth embodiment of the invention.
Figure 20:
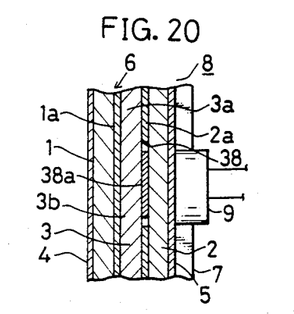
FIG. 20 is a view similar to FIG. 2 with the exception of being partly broken-away portion.

FIGS. 19 through 23 show an eighth embodiment of the invention. The panel 6 includes a rectangular window 38 with the electrode 2a located in a position where the flat mirror 7 is absent. In the window 38 there is positioned a sensing electrode 38a which is disposed to face the photo-sensitive medium 9 across the base plate 2. The electrode 38a has its outer periphery spaced from the inenr periphery of the window 28 as seen in FIGS. 29 and 20 so as to be electrically insulated from the electrode 2a. This divides an overall extension of the liquid crystal 3 into a mirror portion 3a which corresponds to the electrode 2a and a sensing portion 3b which corresponds to the sensing electrode 38a.

Figure 21:
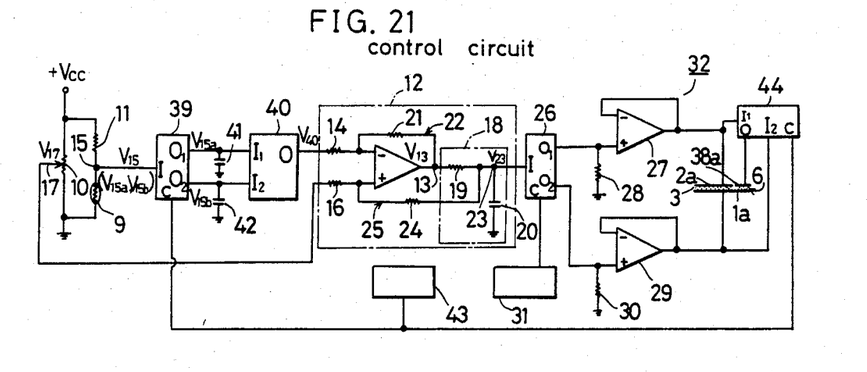
FIG. 21 is an electrical diagram of a control circuit.

Now, attention is called to FIG. 21 in which an analog switch 39 is depicted. The switch 39 connects its input terminal (I) to the detector terminal 15, and connects the first output terminal ($O_1$) to the first input terminal ($I_1$) of a calculator circuit 40 and to ground via a condenser 41. The same switch 39 further connects its second output terminal ($O_2$) to both the second input terminal ($I_2$) and to ground via a condenser 42, and connects the control terminal (C) to an oscillatory circuit 43. The calculator circuit 40 connects its output terminal (O) to the negative input terminal of the differential amplifier 13 via the resistance 14. An analog switch 44 connects its first input terminal ($I_1$) and second input terminal ($I_2$) to the electrodes 2a and 1a respectively, and connects the output terminal (O) and the control terminal (C) to the sensing electrode 38a and the oscillatory circuit 43 respectively.

The analog switch 39 is wired to render the input terminal (I) conductive to the first output terminal ($O_1$), while another analog switch 44 is wired to render its first input terminal ($I_1$) conductive to the output terminal (O) when the oscillatory circuit 43 output is at high level.

When the oscillatory circuit 43 changes its output from high level to low level, the analog switch 39 renders its input terminal (I) conductive to the second output terminal ($O_2$), while the switch 44 renders its second input terminal ($I_2$) conductive to the output terminal (O).

OPERATION

Light that is incident on the view mirror construction 8 passes through the panel 6 and reflects at the first mirror 7 in a manner so that the quantity of the light reflection from the mirror 7 changes contingent on the optical transmittance ($\tau$).

Figure 22:
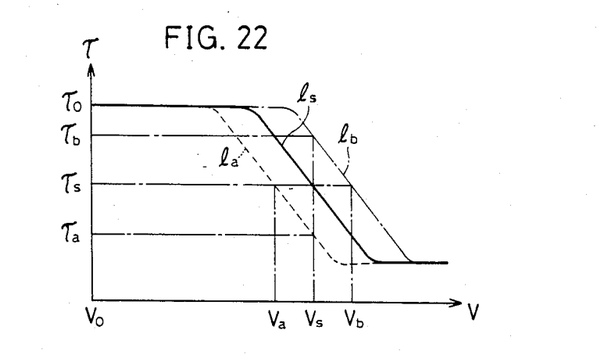
FIG. 22 is a graph similar to FIG. 3.

The liquid crystal panel 6 may subject its characteristics to change from the characteristics (l s) per se into (l a) or (l b) under the influence of dimensional deviations caused during the manufacturing process, by the ambient temperature or due to deterioration caused from aging. This is seen in FIG. 22 in which the characteristics are shown with voltage (V) as the axis of abscissas and the optical transmittance ($\tau$) as the axis ordinates.

In consequence, the transmittance ($\tau_s$) will deviate from the intended value even if the voltage ($V_s$) per se corresponding to the transmittance ($\tau_s$) is applied.

The light incident on the mirror 7 in part falls on the photo-sensitive medium 9 by passing through the sensing portion 3b, causing generation of a detector voltage as a photo-receptor signal at the detector terminal 15, the magnitude of which is dependent on that of the light to which the medium 9 is exposed.

High level output from the oscillatory circuit 43 allows the output voltage from the operational amplifier 27 to be applied to the sensing electrode 38a and to the electrode 2a to change the optical transmittance ($\tau$) of both the mirror portion 3a and the sensing portion 3b among an overall area of the liquid crystal 3. Low level output from the same circuit 43 allows the output voltage from the operational amplifier 29 to be applied to the sensing electrode 38a and to the electrode 1a so as to produce zero voltage at the sensing portion 3b. As a result, the sensing portion 3b alternately undergoes reference voltage $V_o$ and the temporarily determined voltage $V_s$ (respectively referred to as zero voltage and output voltage ($V_{23}$) in this embodiment) to subject its optical transmittance to periodical change. This induces the relationship seen in FIG. 23 which is shown with the detector voltage (($V_{15}$) as the ordinate and time (T) as the abscissa.

Figure 23:
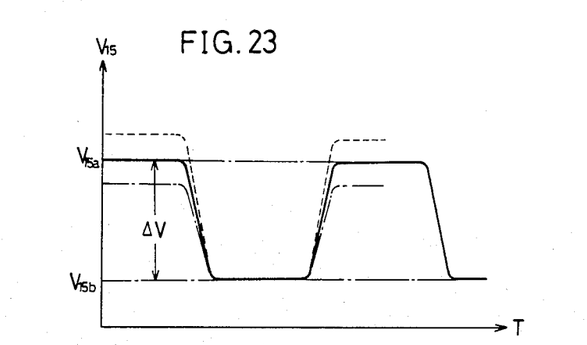
FIG. 23 is a graph showing a wave form of detector voltage vs. time.

In this instance, under uniform intensity of light incident on the panel 6, the sensing portion 3b renders the transmittance ($\tau$) constant at the reference voltage ($V_0$) to allow constant detector voltage ($V_{15}$) such as the voltage ($V_{15b}$), while not always rendering the transmittance constant at the temporarily determined voltage ($V_s$) to allow the voltage ($V_{15}$) for variation.

That is, the voltage ($V_s$) allows the transmittance ($\tau_s$) as intended to render the detector voltage ($V_{15}$) to be one ($V_{15a}$), and thus ensuring the determined differential ($\Delta V$) between the voltages ($V_{15a}$) and ($V_{15b}$) at the solid line characteristics of ($l_s$) in FIG. 22. At the broken line characteristics of ($l_a$) somewhat deviated from that of ($l_s$), the temporarily determined voltage ($V_s$) allows the transmittance ($\tau$) to be ($l_a$) which is smaller than the previous transmittance ($l_s$) to render the detetctor voltage ($V_{15}$) larger than the voltage ($V_{15a}$), thus ensuring a differential which is larger than the previous one ($\Delta V$). The phantom lined characteristics of ($l_b$) is conversely deviated from that mentioned above. The foregoing voltage ($V_s$) allows the transmittance ($\tau$) to be ($\tau_b$) which is larger than the transmittance ($\tau_s$) to render the detector voltage ($V_{15}$) smaller than the voltage ($V_{15a}$), thus ensuring a differential which is smaller than the previous one ($\Delta V$).

In view of the above, the calculator circuit 40 modifies the detector voltage ($V_{40}$) which is duly produced at the output terminal (O) by comparing the differential (V) with head length of the wave form which the detector voltage ($V_{15}$) periodically creates.

As a result, the calculator circuit 40 generates the voltage ($V_{15a}$) as a detector voltage ($V_{40}$) when the detector voltage ($V_{15}$) conforms the head length of the wave form to the differential ($\Delta V$). The same calculator circut 40 generates a voltage larger than the detector voltage ($V_{15a}$) when the voltage ($V_{15}$) is larger then the above wave form of the differential ($\Delta V$) as seen at the characteristic ($l_a$), and generates a voltage smaller than the detector voltage ($V_{15a}$) when smaller than the differential ($\Delta V$) seen at the characteristic ($l_b$).

It is thus seen that the mirror portion 3a among an overall extension of the liquid crystal 3 allows its transmittance to be controlled as determined by, for example, the transmittance ($\tau_s$).

Figure 24:
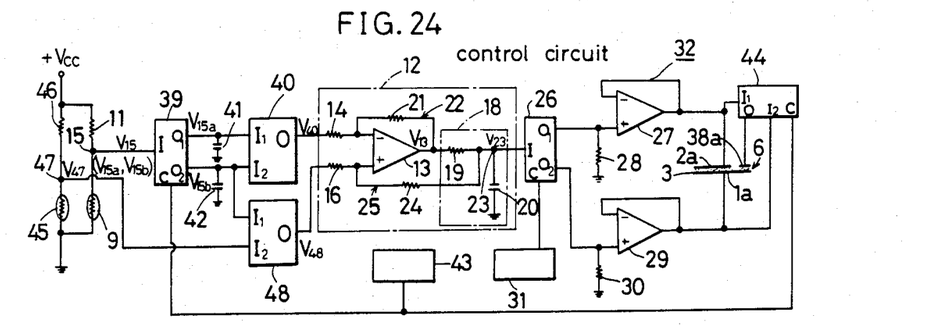
FIG. 24 is an electrical diagram of a control circuit according to a ninth embodiment of the invention.

FIG. 24 shows a ninth embodiment of the invention in which the electrical diagram of a control circuit is represented.

Numeral 45 designates a photo-sensor of cadmium sulfide which is connected between a DC power source terminal ($+V_{cc}$) and ground via a resistance 46 in series therewith, and which is arranged to be exposed to the ambient light around the motor vehicle (not shown). A calculator circuit, represented at 48, has its second input terminal ($I_2$) connected to the detector terminal 47 which is a common point of the photo-sensor 45 and the resistance 46. The same calculator circuit 48 has its first input terminal ($I_1$) connected to the second output terminal ($O_2$) of the analog switch 39 and its output terminal (O) connected to the positive input terminal of the differential amplifier 13 via the resistance 16.

In general, it will be seen that whether the reflection from the mirror construction 8 is glaring or dazzling depends upon the intensity of the ambient light. Therefore, it is possible that the construction 8 could be rendered unacceptable as a view mirror because of the lack of reflection if the panel 6 were to control its transmittance irrespective of the intensity of the ambient light as mentioned in the second embodiment.

In order to cope with such a situation, the photo-sensor 45, has its electrical resistance subject to change according to the ambient light, and thus allows the detector voltage ($V_{47}$) at the terminal 47 to decrease with the increase of the ambient light. The voltage ($V_{47}$) which is thus decreased is fed into the second input terminal ($I_2$) of the calculator circuit 48.

The circuit 48 is connected so that the first input terminal ($I_1$) is fed with detector voltage ($V_{15b}$) produced on the basis of the light passing through the sensing portion 3b when it is adapted to have such reference transmittance as represented at ($\tau$).

Accordingly, the circuit 48 computes the transmittance necessary to provide the most suitable quantity of reflection by comparing the quantity of light that is actually incident on the mirror 8 based on the detector voltage ($V_{15b}$) and the intensity of the ambient light based on the detector voltage ($V_{47}$).

In so doing, the reference voltage ($V_{48}$) which serves as a reference signal, and corresponds to the transmittance calculated as above is produced at the output terminal (O) to be fed into the positive input terminal of the differential amplifier 13.

Figure 25:
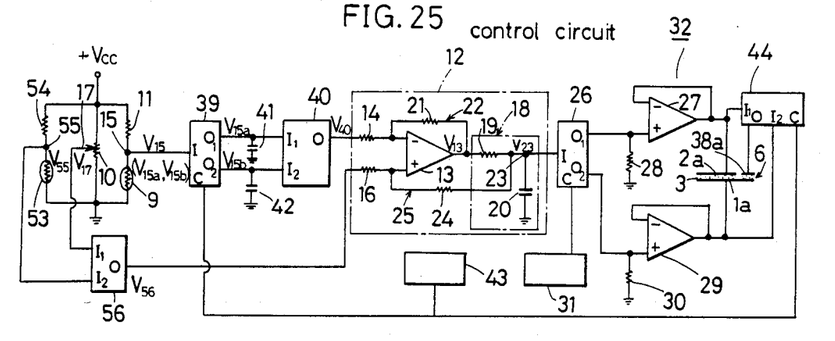
FIG. 25 is an electrical diagram of a control circuit according to a tenth embodiment of the invention.

FIG. 25 shows a tenth embodiment of the invention. Numeral 53 designates a second photo-sensitive medium of cadmium sulfide which is provided at the lateral end of the panel 6 in a position to be directly susceptive to the light emanated from, from example, the head lamps of a trailing motor vehicle. The medium 53 is connected across the DC power source terminal ($+V_{cc}$) and ground via a resistance 54 which is connected in series therewith. A calculator circuit 56 has its second input terminal ($I_2$) connected to a detector terminal 55 which is equivalent to a common point of the medium 53 and the resistance 54. The first input terminal ($I_1$) is connected to the reference terminal 17 of the rheostat 10 with the output terminal (O) being connected to the positive input terminal of the differential amplifier 13 via the resistance 16.

The calculator circuit 56 calculates the transmittance for the most suitable reflection on the basis of the reference voltage ($V_{17}$) from the rheostat 10 and the detector voltage ($V_{55}$) from the photo-sensitive medium 53 which monitors the intensity of the light from the trailing vehicle head lamps. The transmittance thus calculated functions to rectify the detector voltage ($V_{17}$) so as to produce a reference voltage ($V_{56}$) at the output terminal (O) of the calculator circuit 56 as a reference signal.

Consequently, the same effects as mentioned in the second embodiment are obtained.

Figure 26:
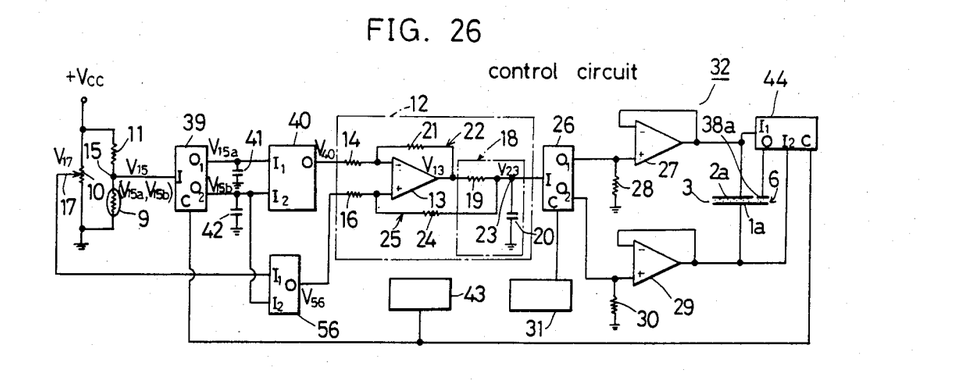
FIG. 26 is an electrical diagram of a control circuit according to an eleventh embodiment of the invention.

FIG. 26 shows an eleventh embodiment of the invention in which the photo-sensitive medium 53 and the resistance 54 of the tenth embodiment are removed. Therefore, the second input terminal ($I_2$) of the calculator circuit 56 connects to the second input terminal ($O_2$) of the analog switch 39.

The electrical circuit is so designed that the intensity of the detector voltage ($V_{15b}$), which is based on the light incident on the sensing portion 3b at the reference transmittance ($\tau_0$), is proportional to the quantity of the light from the head lamps. This is conductive to obtaining the same effects as mentioned in the tenth embodiment.

It is noted that the control circuit may be nullified by the detector signal from the photo-sensor 45 in the daytime.

In addition, the control circuit may be nullified by on-off signals from the head lamps of a motor vehicle in place of the photo-sensor 45.

In addition the control circuit may be nullified by on-off signals for head lamps for motor vehicles in place of the photo-sensor 45.

Instead of the photo-sensor 45, a variable resistor means may be employed which can be manually manipulated.

Further, an electrochromic device may be employed instead of the liquid crystal panel 6.

While the form of the invention now preferred has been disclosed as required by statute, other forms may be used, all coming within the scope of the claimed subject matter which follows:

We claim:

1. A reflection controllable rear view mirror device having an electro-optical means, the transmittance of which varies in accordance with voltage applied thereto to change a quantity of light passing therethrough, and a mirror means mounted on the electro-optical means for reflecting said light, comprising:
  (A) a photo-sensitive means for simultaneously receiving both light passing through the electro-optical means and light, the quantity of which is not varied by the electro-optical means,
  said photo-sensitive means producing electric signals, the magnitude of which signals correspond with the summation of the light passing through the electro-optical means and the light, the quantity of which is not varied by the electro-optical means, and
  (B) a control circuit for controlling voltage applied to the electro-optical means so that the magnitude of the electric signals produced by the photo-sensitive means may become equal to a predetermined value.

2. A reflection controllable rear view mirror device as set forth in claim 1, wherein the photo-sensitive means comprises a first photo-sensor for receiving the light passing through the electro-optical means and a second photo-sensor for receiving the light, the quantity of which is not varied by the electro optical means.

3. A reflection controllable rear view mirror device as set forth in claim 2 wherein the output of the photo-sensitive means is gained as the summation of the output produced by the first and second photo-sensors.

4. A reflection controllable rear view mirror device as set forth in claim 1 wherein said photo-sensitive means comprises an optical fiber for guiding to a photo-sensor the light, the quantity of which is not varied by the electro-optical means.

5. A reflection controllable rear view mirror device comprising
  (A) an electro-optical means the optical transmittance of which varies in accordance with voltage applied thereto;
  (B) a mirror means mounted on the electro-optical means for reflecting light passing therethrough and a photo-sensing portion provided adjacent to the mirror means for allowing light to pass therethrough;
  (C) a photo-sensitive means for receiving light passing through the photo-sensing portion;
  (D) a calculator circuit for modifying a differential to become a desired value, said differential being produced as a result of varying the output voltage of the photo-sensitive means by alternately applying a reference voltage and a tentatively-set voltage to the photo-sensing portion;
  (E) a means for setting the quantity of light passing through the electro-optical means;
  (F) a circuit means including a differential amplifier for comparing the reference voltage ($V_{17}$) produced by the means for setting with an output voltage ($V_{40}$) from the calculator circuit to vary the voltage applied to the electro-optical means so that the quantity of light may become equal to the predetermined value of the voltage ($V_{17}$); and
  (G) a corrector means for converting the quantity of light falling onto the outer surface of the electro-optical means into electric signals to control the predetermined value of the voltage ($V_{17}$) in accordance with said electric signals so that the transmittance of the electro-optical means may decrease with the increase of the quantity of light falling onto the outer surface of the electro-optical means.

* * * * *